(12) United States Patent
Matherson et al.

(10) Patent No.: US 7,151,560 B2
(45) Date of Patent: Dec. 19, 2006

(54) METHOD AND APPARATUS FOR PRODUCING CALIBRATION DATA FOR A DIGITAL CAMERA

(75) Inventors: Kevin J Matherson, Fort Collins, CO (US); Christopher A Whitman, Fort Collins, CO (US); Jason E Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 769 days.

(21) Appl. No.: 10/174,946

(22) Filed: Jun. 20, 2002

(65) Prior Publication Data
US 2003/0234864 A1    Dec. 25, 2003

(51) Int. Cl.
*H04N 17/00* (2006.01)

(52) U.S. Cl. ...................... 348/187; 348/187
(58) Field of Classification Search ........... 348/187, 348/188, 207.99, 241, 251, 615, 175; 378/98.7
See application file for complete search history.

(56) References Cited

U.S. PATENT DOCUMENTS

| | | | | | |
|---|---|---|---|---|---|
| 4,608,593 | A | * | 8/1986 | Miyaji et al. | 348/263 |
| 4,816,663 | A | * | 3/1989 | Utagawa et al. | 250/201.2 |
| 5,181,098 | A | * | 1/1993 | Guerin et al. | 348/187 |
| 5,319,443 | A | * | 6/1994 | Watanabe et al. | 356/614 |
| 5,381,174 | A | * | 1/1995 | de Groot et al. | 348/207.99 |
| 5,434,902 | A | * | 7/1995 | Bruijns | 378/98.7 |
| 5,659,357 | A | * | 8/1997 | Miyano | 348/223.1 |
| 5,659,813 | A | * | 8/1997 | Kusaka et al. | 396/111 |
| 5,699,440 | A | * | 12/1997 | Carmeli | 382/100 |
| 5,764,386 | A | * | 6/1998 | Robinson | 358/504 |
| 6,016,161 | A | * | 1/2000 | Robinson | 348/187 |
| 6,437,823 | B1 | * | 8/2002 | Zhang | 348/187 |
| 6,707,500 | B1 | * | 3/2004 | Tamura et al. | 348/362 |
| 6,833,862 | B1 | * | 12/2004 | Li | 348/207.99 |
| 7,023,472 | B1 | * | 4/2006 | Kang et al. | 348/187 |
| 7,038,712 | B1 | * | 5/2006 | Livingston et al. | 348/187 |
| 2003/0052987 | A1 | * | 3/2003 | Li et al. | 348/335 |
| 2005/0030383 | A1 | * | 2/2005 | Li | 348/207.1 |

FOREIGN PATENT DOCUMENTS

| | | |
|---|---|---|
| EP | 0508607 A | 10/1992 |
| JP | 08 251528 A | 9/1996 |

OTHER PUBLICATIONS

Netherlands Search Report dated Oct. 11, 2005.

* cited by examiner

*Primary Examiner*—Paulos M. Natnael

(57) ABSTRACT

Producing calibration data (to remove vignetting, e.g., color-dependent vignetting) for a digital camera includes: arranging, in front of the camera, a white reference surface that is to be imaged; capturing, via the camera, a characteristic array of data corresponding to an image of the reference surface for each color that the camera can image; and manipulating each characteristic array to reduce a total amount of data representing the reference image.

50 Claims, 10 Drawing Sheets

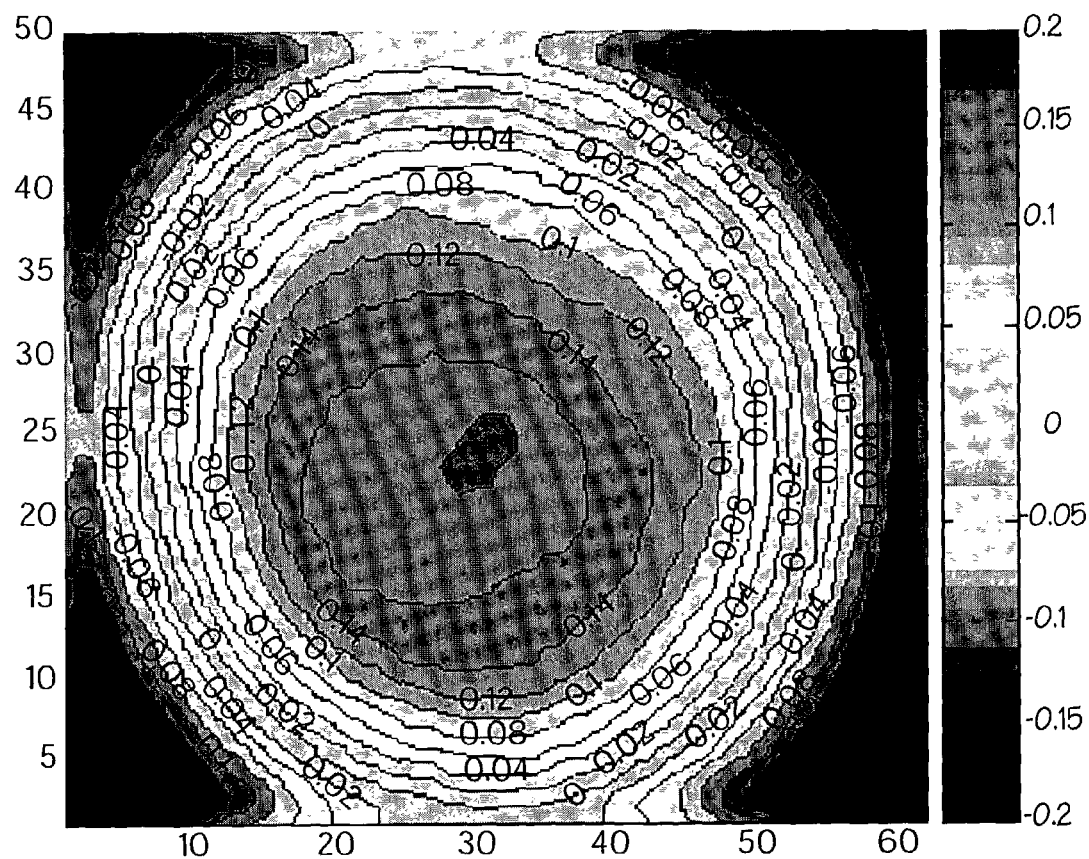
FIG. 3A (RED)

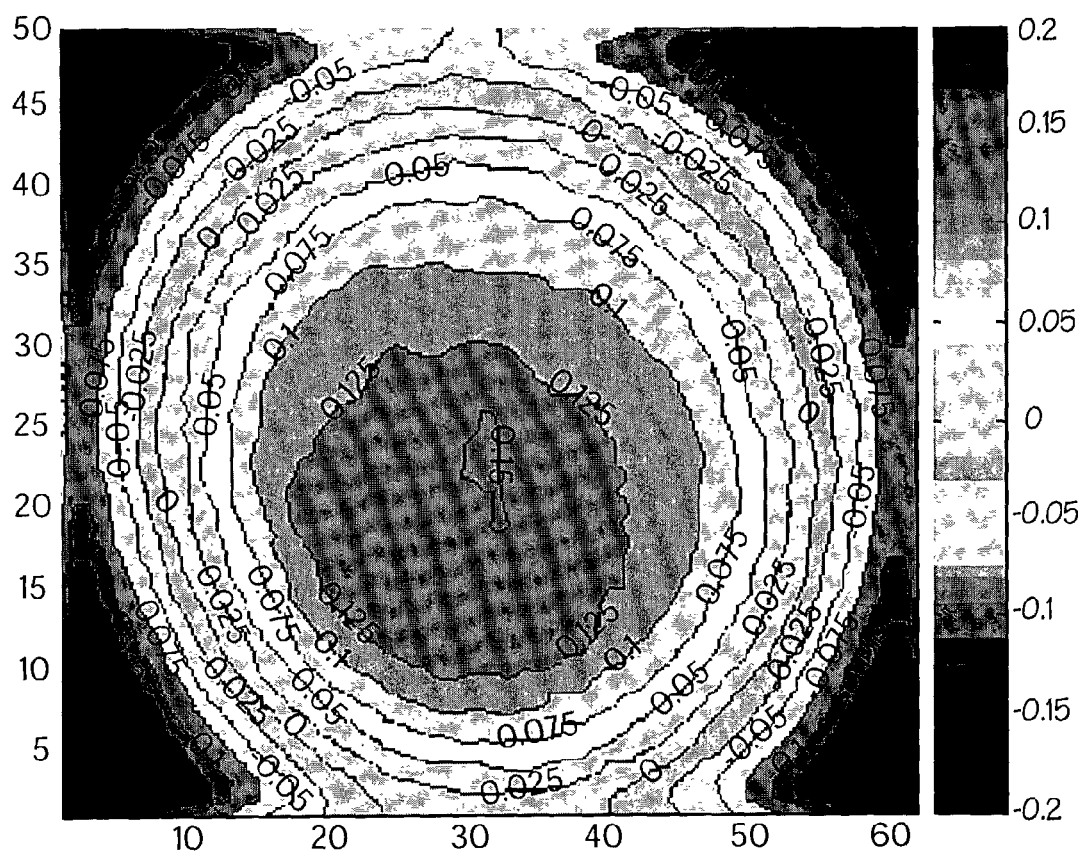
FIG. 3B (GREEN)

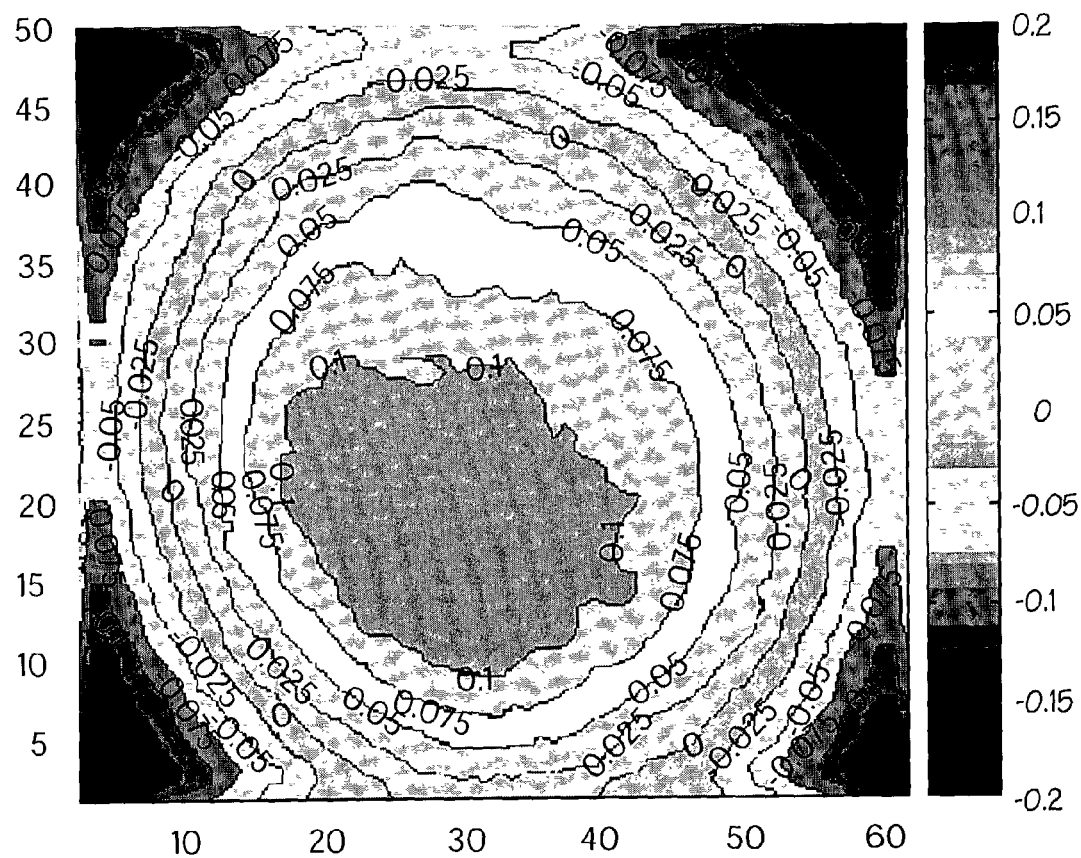
FIG. 3C (BLUE)

METHOD AND APPARATUS FOR PRODUCING CALIBRATION DATA FOR A DIGITAL CAMERA

FIELD OF THE INVENTION

The invention is generally directed toward digital photography, and more particularly is directed toward the production of calibration data for use in a digital camera.

BACKGROUND OF THE INVENTION

Non-color-dependent vignetting is a photographic phenomenon in which the picture taken by the camera exhibits a darkening from the center to the corners irrespective of what color is present. Photographs taken by both a film camera and images taken by a digital camera can exhibit vignetting. Some amount of vignetting is acceptable, and actually desirable from an artistic sense. But an excessive amount of vignetting will be objectionable to most people.

In either a film camera or a digital camera, such vignetting is caused by having to capture an image on a small flat surface, namely the film or the optical-to-electronic imager, e.g., a charge coupled device ("CCD"). In either type of camera, rays of light striking the corners of the film/imager travel a longer path and arrive at a different angle of incidence than rays of light that impinge directly upon the center of the film/imager.

Differences in the response of the film/imager to light impinging directly versus light impinging at an angle produce non-uniformity in the captured image, some of which is characterized as vignetting. The lens system can also effect vignetting. Plus, if the camera uses a flash device, vignetting can also be due to the flash device's variation in illumination intensity across the subject.

The image sensor of a digital camera can introduce color-dependent vignetting as well. A typical color image sensor in a digital camera includes a mosaic type of image sensor, e.g., a CCD, over which is formed a filter array that includes the colors red, green and blue. Each pixel has a corresponding red, green or blue filter area. A typical implementation of the color filter repeats a two-line pattern. The first line contains alternating red and green pixels and the second line contains alternating blue and green pixels. The larger number of green pixels represents an adaptation for the increased sensitivity to green light exhibited by the human eye. The separate color arrays, or planes, of data images formed by the sensor are then combined to create a full-color image after suitable processing.

Color-dependent vignetting should be understood as color-sensitivity variation exhibited in the image captured by the image sensor from the center of the image to the corners. This can be exhibited in addition to regular non-color-dependent vignetting. The human eye is very sensitive to color-dependent variation. Hence, color-dependent vignetting is very objectionable, even in small amounts.

Color-dependent vignetting can be minimized by using higher quality lens systems, image sensors and/or flash devices. But this is an impractical solution in a situation in which minimization of system cost and/or system complexity are important design criteria.

SUMMARY OF THE INVENTION

The invention, in part, provides a method (and corresponding apparatus) for producing calibration data for a digital camera. Such a method comprises: arranging, in front of said camera, a reference surface that is to be imaged; and capturing, via said camera, a characteristic array of data corresponding to an image of said reference surface for each color that said camera can image.

Such technology not only includes a method, but also a corresponding system and computer-readable medium (having code portions thereon that, when executed by a processor, cause the processor to perform the method).

Additional features and advantages of the invention will be more fully apparent from the following detailed description of example embodiments, the appended claims and the accompanying drawings.

BRIEF DESCRIPTION OF THE DRAWINGS

FIGS. 3A, 3B, and 3C depict example contour plots of pixel sensitivity for red, green and blue color planes or arrays, respectively, produced according to an embodiment of the invention.

DETAILED DESCRIPTION OF EXAMPLE EMBODIMENTS

An embodiment of the invention, in part, is a recognition that digital processing of a raw digital image can improve the quality of the digital image with respect to vignetting, e.g., color-dependent-vignetting.

An embodiment of the invention, also in part, is a recognition that digital correction of the digital image can be based upon reference or calibration data by which raw data of a desired scene can be corrected.

An embodiment of the invention, also in part, provides technology for producing such calibration data.

An embodiment of the invention, also in part, is a recognition that very good color-dependence correction results can be achieved if a few sets of red, blue and green characteristic arrays or planes corresponding to a few of the many possible combinations of camera operating parameters, e.g., aperture and zoom, are captured.

An embodiment of the invention, also in part, is a recognition that good color-dependence correction results can be obtained if the amount of data represented by the calibration sets (of characteristic arrays) is reduced relative to the amount of data representing an image.

Figure 1:
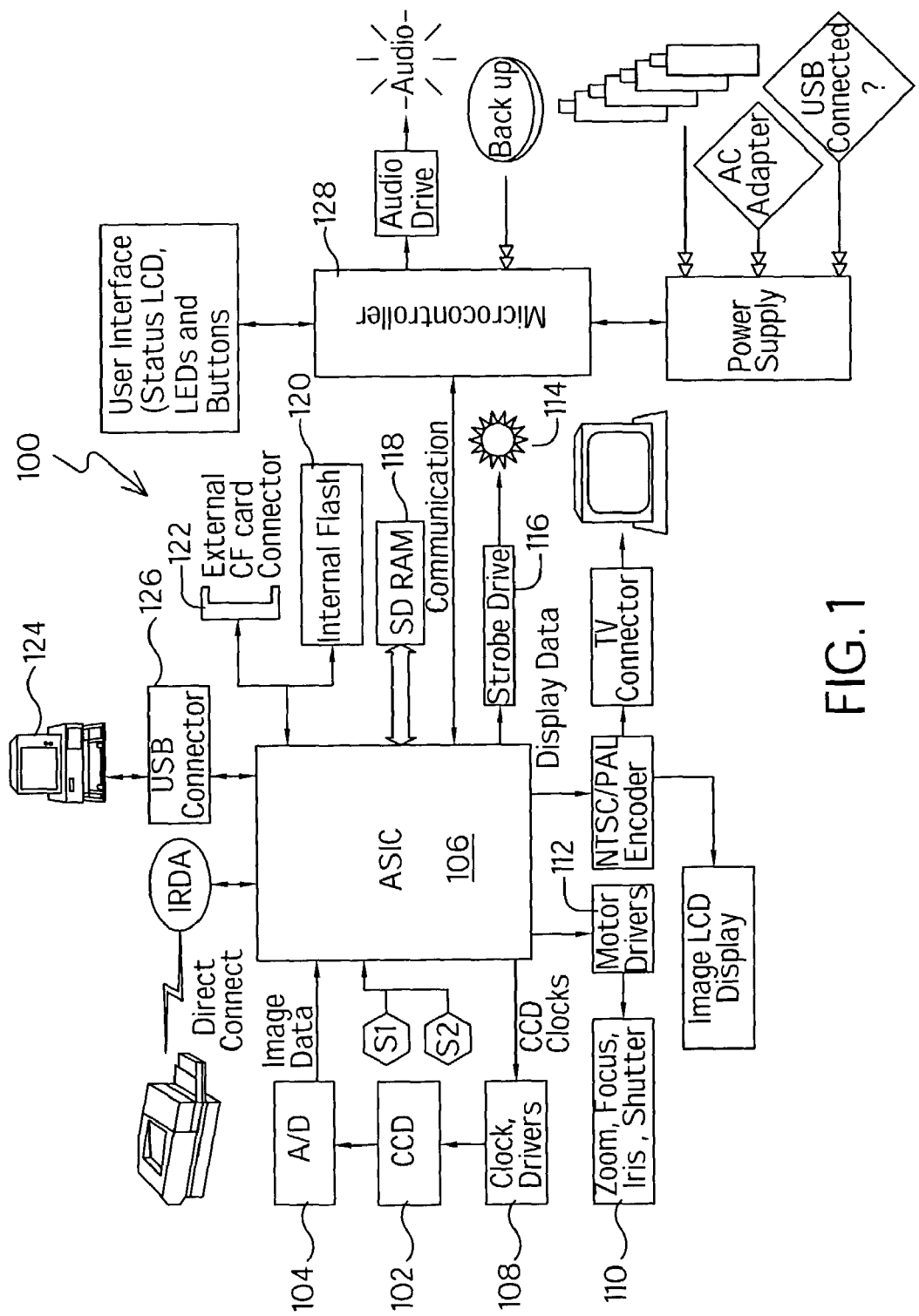
FIG. 1 is a schematic block diagram of hardware architecture of a digital camera according to an embodiment of the invention.

FIG. 1 is a schematic block diagram of the hardware architecture of a digital camera according to an embodiment of the invention. The digital camera 100 of FIG. 1 includes a charge-coupled-device ("CCD") 102 that provides an analog signal to an analog-to-digital ("A/D") device 104, the A/D converter 104 providing digitized output of the CCD 102 to an application-specific integrated circuit ("ASIC")

106. The ASIC 106 provides clock signals to clock drivers 108 that are used to operate the CCD 102.

The camera 100 also includes: zoom (optional), focus, iris and shutter mechanisms 110 that are operated via motor drivers 112 by the ASIC 106; and a strobe unit 114 operated via a strobe drive 116 controlled by the ASIC 106. As for memory devices, the digital camera 100 includes: a volatile memory, namely a synchronous dynamic random access memory ("SDRAM") device 118; and a non-volatile memory, namely internal flash memory device 120, plus a connector 122 for connection to an external compact flash memory device. The ASIC 106 can also connect to an external work station 124, typically through a universal serial bus ("USB") connector 126.

The digital camera 100 also includes a microcontroller 128 with which the ASIC 106 can communicate.

Other architectures for the camera are contemplated. Each such architecture can include one or more processors, one or more volatile memory devices and one or more non-volatile memory devices.

Figure 2:
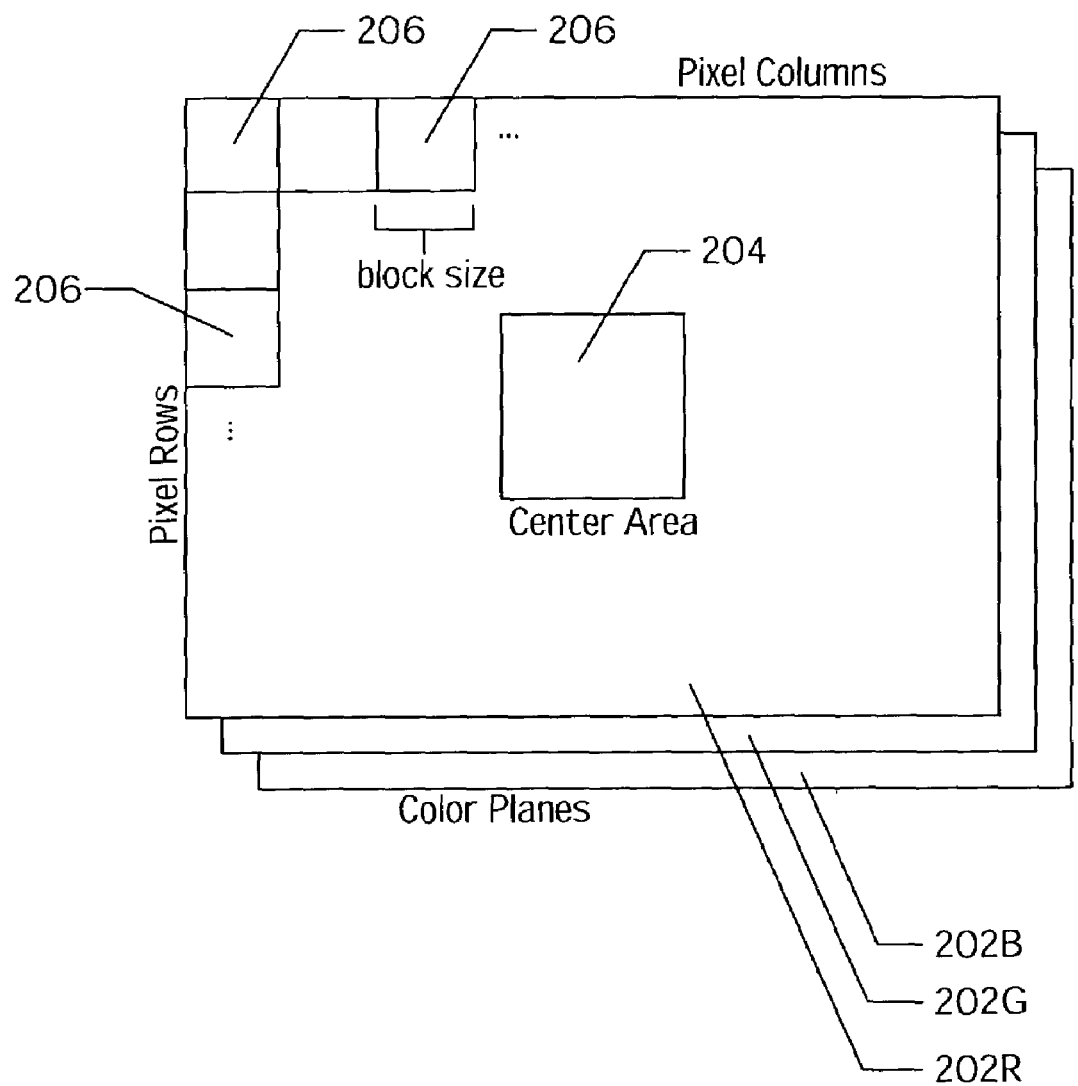
FIG. 2 symbolically depicts 3 color planes produced by a digital camera according to an embodiment of the invention.

FIG. 2 symbolically depicts the 3 color planes (202R, 202G and 200B) that are produced by the camera 100 for each imaged scene. Typically, the three color planes can be generated as follows. The camera 100 actually produces a mosaic image (not depicted) where the first line is R G R G R G ... and the second line is G B G B G B. This line pattern repeats every 2 lines. To get the three planes, the mosaic image is separated into 2×2 blocks. From each of these blocks, the two greens are averaged and red and blue pixels are taken as-is. This produces three planes that are ¼ the resolution of the full image sensor. For later reference, each plane 202 can be divided into blocks 206 of the same size. Also, each plane has a center area 204.

The less complex and/or sophisticated is a CCD 102, the more prone it will be to color-dependent vignetting. A technique for measuring the degree of color-dependent vignetting is to photograph a uniformly-illuminated white target with the digital camera and then evaluate each color plane separately. The evaluation can be in the form of a contour plot in which the X and Y axes correspond to the column and row values of the pixels across the image. FIGS. 3A, 3B and 3C depict example contour plots for a red array, a green array and a blue array, respectively, for an arbitrary combination of camera parameters (e.g., zoom, aperture, shutter speed, etc.). The gray scale to the right of each plot is a legend explaining the range of shading seen in the accompanying contour plot, which varies from −20% to +20%. In other words, contours denote 2% differences in shading magnitude.

FIGS. 3A, 3B and 3C reveal that the example camera exhibits non-color-dependent vignetting because pixel magnitude, i.e., the sensitivity to red, green and blue light of the CCD 102 at pixel granularity, varies across the image of the uniformly-lit white target. If no non-color dependent vignetting were exhibited, then every pixel magnitude would have been identical to the value at the center of the image for all pixel locations in the CCD 102.

Further inspection of FIGS. 3A, 3B and 3C also reveals that each is different. As such, FIGS. 3A, 3B and 3C collectively illustrate that the camera 100 also exhibits color-dependent vignetting. In other words, if each of FIGS. 3A, 3B and 3C were identical, then the camera 100 would not exhibit color-dependent vignetting.

Figure 4:
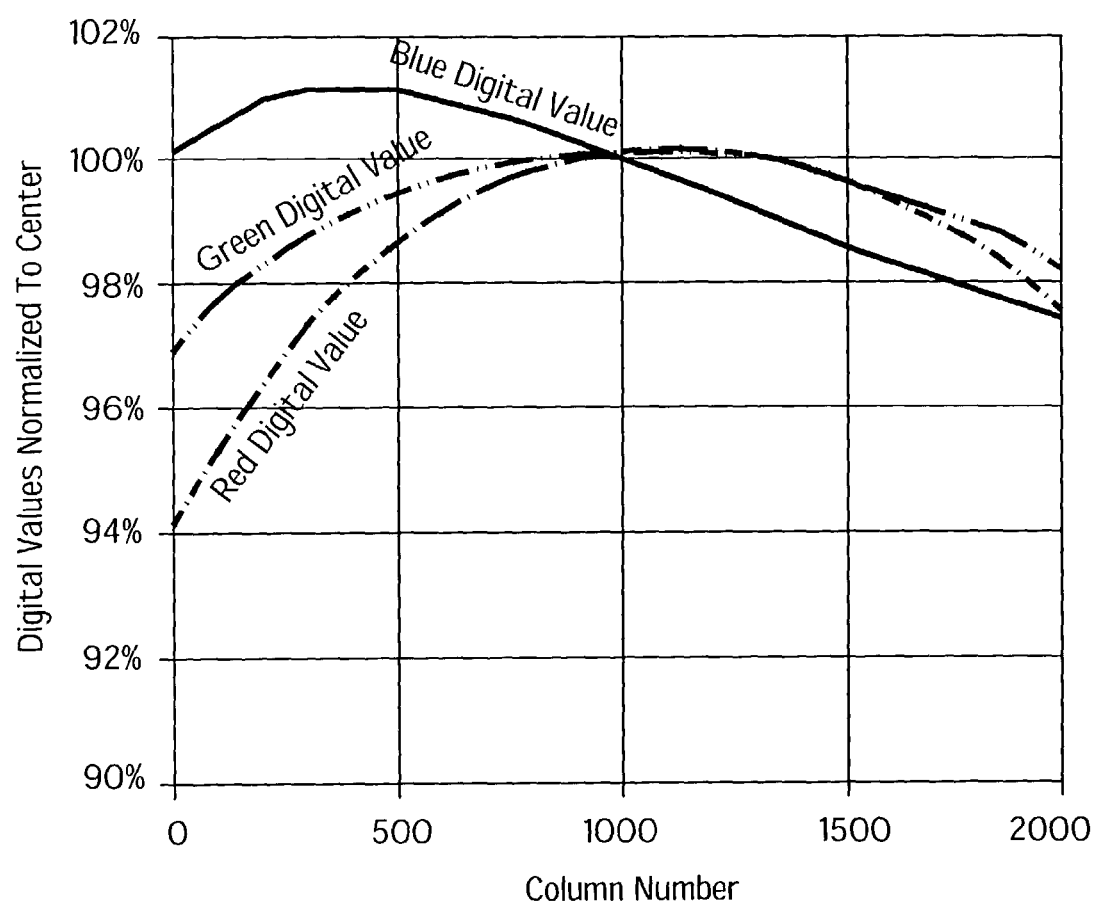
FIG. 4. is a combined plot of FIGS. 2–4 albeit for pixel magnitudes corresponding to one row of pixels.

FIG. 4 depicts a graph of red, green and blue pixel values plotted versus column number for the same arbitrary row of pixels from each of example FIGS. 3A, 3B and 3C, e.g., row 800. If the camera 100 had no non-color-dependent vignetting, then FIG. 4 would be a plot of three horizontal lines. And if the camera 100 also exhibited color-dependent vignetting, then the three horizontal lines would be separate. But if there also was no color-dependent vignetting, then the three horizontal lines would be superimposed so that, in effect, only one would be visible on the plot.

In a situation in which the camera exhibits non-color-dependent vignetting, then the plots are some sort of curve, as are the circumstances of FIG. 4. If the camera exhibits no color-dependent vignetting (and yet exhibits non-color-dependent vignetting), then the three curves would be identical and superimposed so that, in effect, only one curve would be visible on the plot. If the camera exhibits both non-color-dependent vignetting as well as color-dependent vignetting, then the result is a plot like that depicted in FIG. 4.

In FIG. 4, the magnitude of each pixel value has been normalized relative to its center pixel's value, i.e., each pixel magnitude has been divided by the magnitude of the corresponding center pixel such that the normalized center pixel has a magnitude of 1.0 or 100%.

Figure 5:
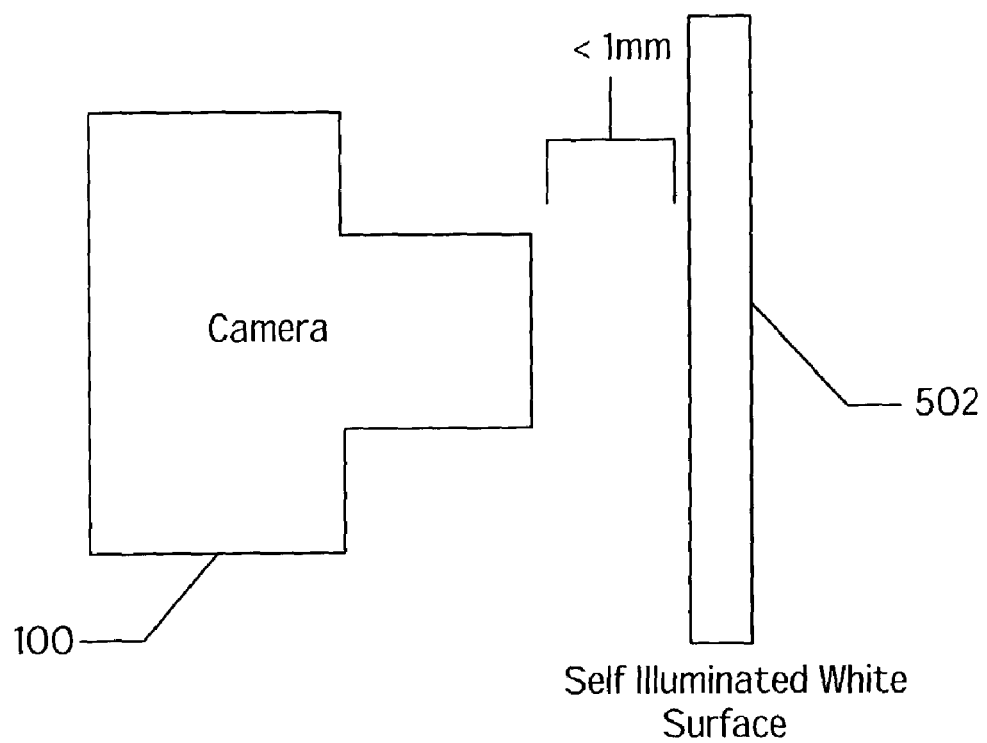
FIG. 5 depicts an arrangement for capturing characteristic color planes or arrays of the digital camera according to an embodiment of the invention.

To create calibration data that can be used to reduce color-dependent vignetting, raw data should be obtained, e.g., captured, that accurately reflects the degree to which each color array will exhibit color dependence, i.e., characteristic data. First, the camera 100 is placed very closely, e.g., less than one millimeter, in front of a white, flat-field, self-illuminated calibration source 502 as shown in FIG. 5. The camera 100 is positioned so closely to the source 602 in order to minimize light, other than from the source 602, reaching the CCD 102. Such a calibration source 602 is the ARROWIN brand of calibration source, model LB-5000 LIGHT SOURCE made available by the KYORITSU ELECTRIC COMPANY.

The camera's exposure can be set so that approximately one-fourth (¼) of the dynamic range of the CCD 102 is used to image the calibration source 602. This exposure setting is suggested because a typical photographer's pictures will use only one-fourth (¼) of a CCD's 102 dynamic range. It is suggested that the focal length be set to infinity because that is the focal length that is most typically used with a digital camera having a CCD 102. Variations in the amount of exposure and in the focal length (as well as other camera operating parameters) used to capture the image are contemplated because optimal values will vary depending upon the judgment of the operator whose job it is to produce the calibration data.

In addition to the amount of exposure and focal length, there are other operational parameters of digital camera 100. The operational parameters include zoom, aperture, shutter speed, etc., Ideally, image data for the calibration source would be captured for every possible combination of the camera's 100 operational parameters. But, as a practical matter, this is not possible because storage of so much data translates into a size of non-volatile memory device that is too large and/or too expensive. As technology progresses, however, it will become increasingly more practical.

Typically, it is desired to keep the size of the non-volatile memory, e.g., flash memory 120, at a minimum in order to minimize the cost of the camera 100 and/or reduce the size of the camera. To do so, fewer calibration sets of red, blue and green characteristics arrays or planes than would correspond to all of the possible combinations of the camera's 100 parameters should be stored.

In particular, in the example of a camera 100 having three aperture settings (0, ½, full or 1.0) and three zoom settings (wide, medium and telephoto), it has been found that good color-dependence correction can be achieved if six calibration sets of red, blue and green characteristic arrays or planes are stored that correspond to the following combinations: wide zoom and ½ aperture; medium zoom and ½ aperture; telephoto zoom and ½ aperture; wide zoom and full aperture; medium zoom and full aperture; and telephoto zoom and full aperture. However, it is envisioned that other combinations of operational parameters can be selected which will achieve good color-dependence correction results despite the use of fewer arrays than would correspond to all of the possible combinations of operational parameters.

For color-dependent vignetting correction, the vignetting exhibited in response to a white calibration source by one of the three corresponding characteristic color planes should be chosen as the standard to which the other color arrays will be corrected for a given imaged-scene. In this discussion, the green array will be chosen as the response distribution to which the red and blue arrays will be corrected, e.g., because the human eye is most sensitive to wavelengths of green light. But the red array or green array could be chosen as the basis for normalization.

As mentioned, each pixel in a raw color array can be corrected for color-dependent vignetting using its corresponding calibration coefficient. The equations to determine each color's correction factor, namely $C_R(x,y)$, $C_G(x,y)$ AND $C_B(x,y)$, in a green-normalization, color-dependence correction scenario are:

$$C_R(x,y) = (G^{ref}(x,y)/R^{ref}(x,y))*(R^{ref}_{center}/G^{ref}_{center})$$

$$C_B = (G^{ref}/B^{ref})*(B^{ref}_{center}/G^{ref}_{center})$$

$$C_G = 1 = (G_{ref}/G_{ref})*(G^{ref}_{center}/G^{ref}_{center})$$

Here, because a green-normalization scenario is assumed, there are no color-dependence correction factors for raw green pixel data. Such green-normalization is advantageous in mosaic sensors with two greens for every red and blue pixel as it will be more computationally efficient. The superscript "ref" denotes that the respective pixel values are from the characteristic color plane, i.e., the raw data captured when a white calibration source was imaged. And the subscript "center" denotes the pixel value at the center of the respective characteristic array.

The sets of calibration coefficients produced using the equations for $C_R$, $C_B$ and $C_G$ will preserve non-color-dependent vignetting, but will correct the variation in color that occurs with each color plane as you go from its center to its edges. Either the processor 128 and/or the ASIC 106 can calculate the correction factors. Alternatively, the work station 124 could supplement, or do all of, the calculations.

The equations (in a green-normalization scenario) for color correction of a pixel, R(x,y), G(x,y), or B(x,y), are:

$$R_{corr} = C_R * R_{raw}$$

$$B_{corr} = C_B * B_{raw}$$

$$G_{corr} = G_{raw}$$

where the subscript "raw" denotes the raw pixel magnitude and the subscript "corr" denotes the corrected pixel magnitude. It must be remembered that the correction factor for a raw green data array is one in a green-normalization scenario. Again, the color correction calculations can be performed by the processor 128 and/or the ASIC 106. Alternatively, they could be performed in part or in whole by the workstation 124.

If it is desired to remove non-color-dependent vignetting as well as color-dependent vignetting, then the following equations can be used.

$$C_r = R^{ref}_{center}/R^{ref}(x,y)$$

$$C_b = B^{ref}_{center}/B^{ref}(x,y)$$

$$C_g = G^{ref}_{center}/G^{ref}(x,y)$$

The equations above for $R_{corr}$ and $B_{corr}$ remain the same.

The new equation for $G_{corr}$ would be:

$$G_{corr} = C_g * G_{raw}$$

A typical camera on the market has a sensor having between 1 mega pixels ("MP") and 5 MP. For a 2 MP sensor, there are 1600×1200=1,920,000 pixels. And three megapixel cameras, which are becoming much more common in the market, have 2,048×1536=3,145,728 pixels. Even though the invention is a recognition that six sets of calibration arrays (with a set including red, blue and green planes) can be sufficient to obtain good results, this corresponds to over 18 megabytes of data. Generally, this much data consumes too much non-volatile, e.g., flash, memory.

To reduce the amount of data representing a characteristic array, the characteristic array can be divided into blocks, e.g., 64×64 or 32×32. The actual size of the block can be empirically predetermined so that there will be a strong likelihood of less than 1% shading variation between pixels in each block. A value representative of all of the values in the block is determined and that value is entered into a reduced characteristic plane. These corresponding reduced characteristic planes are known as a calibration set array. This data reduction process is symbolically depicted in FIG. 6. For visual simplicity, FIG. 6 assumes a characteristic plane having a mere 32×32 pixels, with blocks that are 8×8 mapped into a 4×4 calibration array.

Figure 6:
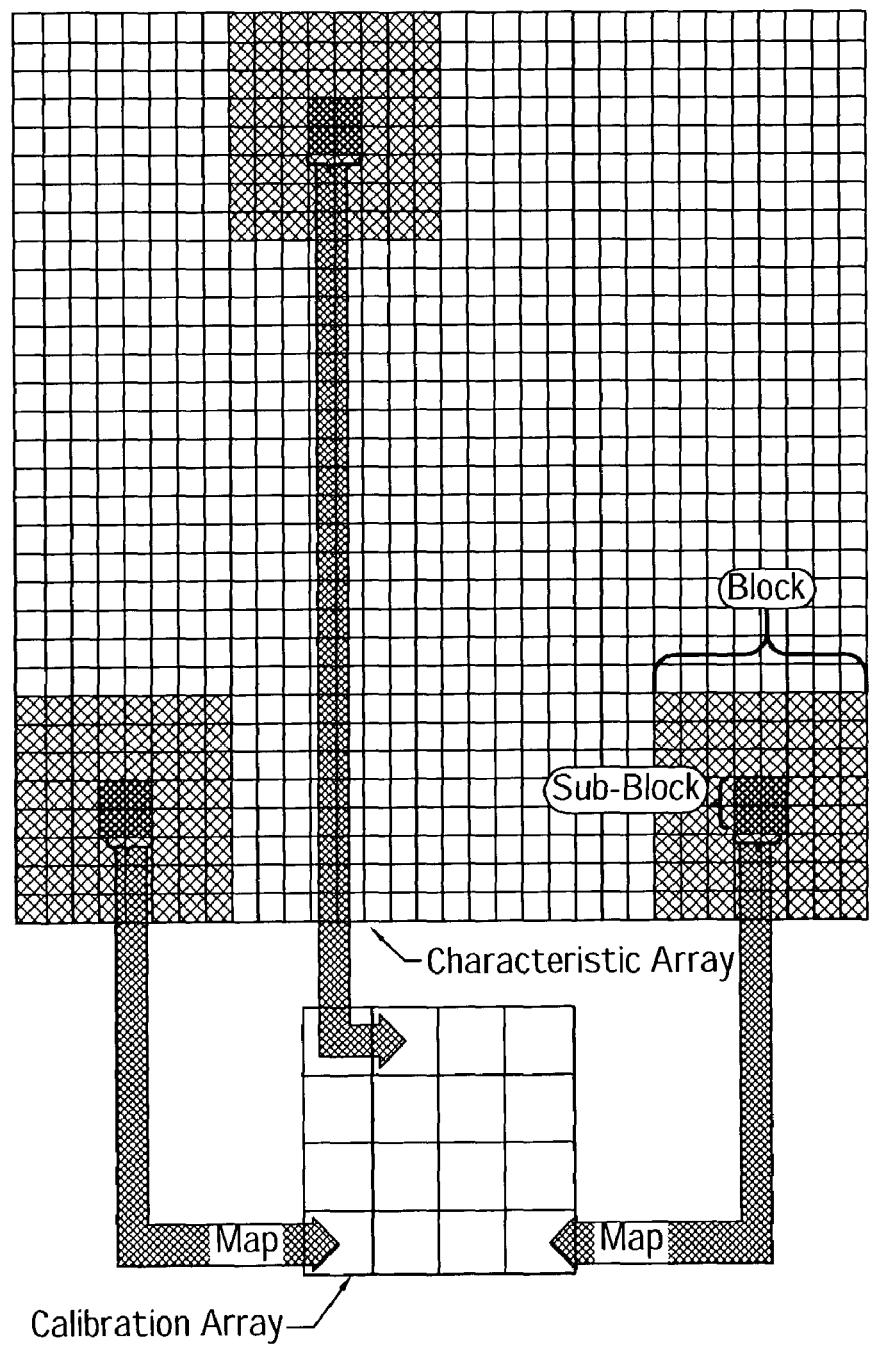
FIG. 6 symbolically depicts a data-reduction technique according to an embodiment of the invention.

A first example technique for reducing the amount of data in each block (206 in FIG. 2) is to select a smaller, preferably centrally located, sub-block within the block. FIG. 6 assumes a 4×4 sub-block for visual simplicity. The sub-block can be averaged and the average value stored as the corresponding entry in the corresponding plane or array in the calibration set.

Alternatively, the values in the block can be low-pass filtered. More particularly, in the frequency domain, high frequency data represents a large change between adjacent pixels. This is indicative of a hot pixel or a cold pixel on the image sensor. A hot pixel always provides a high output irrespective of the intensity of impinging light. Similarly, a cold pixel always provides a low output irrespective of the intensity of impinging light. Such high frequency data is eliminated via the low pass filter. Then the median value of the filtered block can be calculated and selected as the representative value in the calibration array.

It is expected that other data reduction processes can be used. The choice of such depends upon the circumstances to which the invention is applied.

Figure 7:
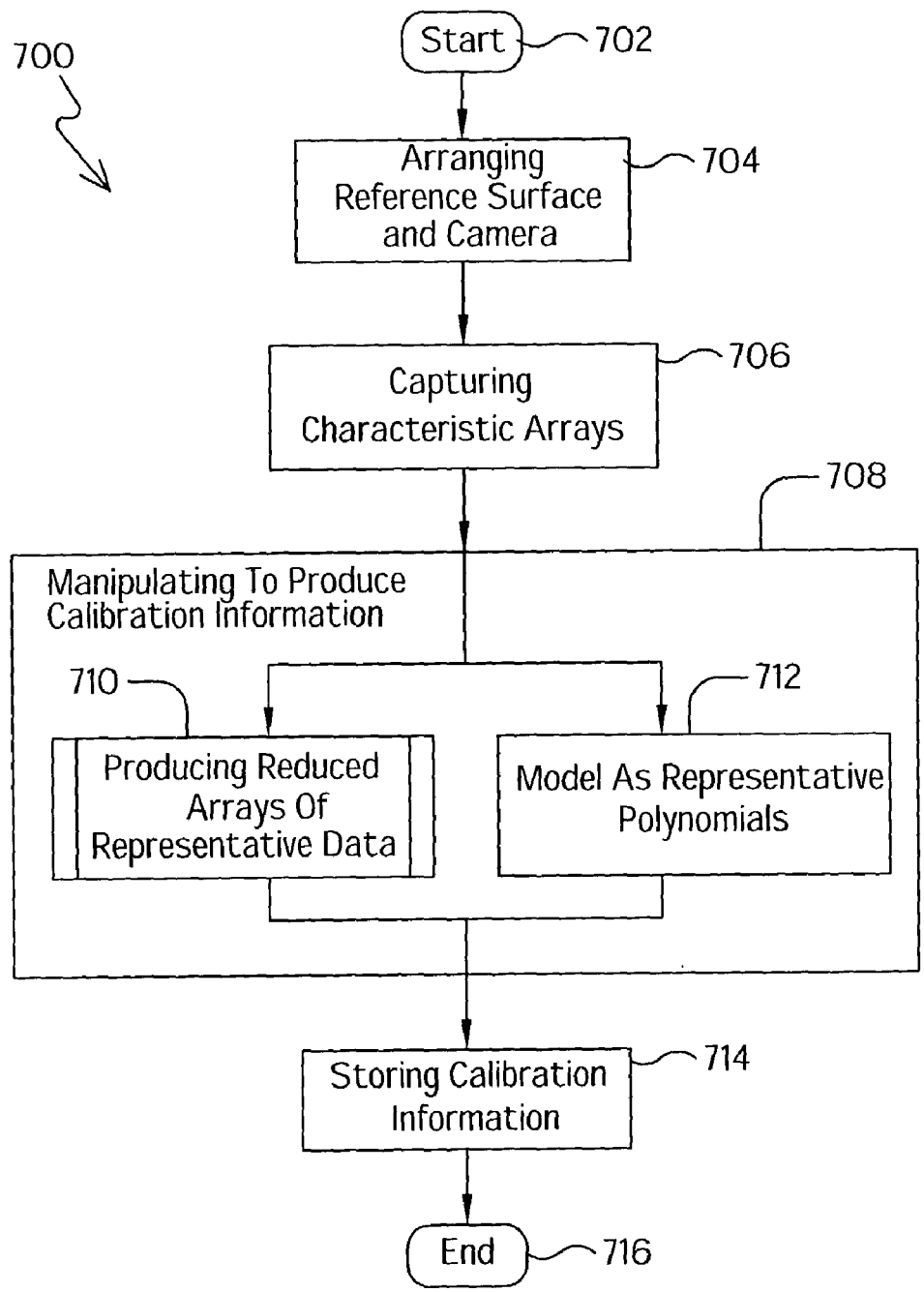
FIG. 7 depicts operations according to an embodiment of the invention.

FIG. 7 is a flow chart depicting operations according to an embodiment of the invention. Flow starts in block 702 and proceeds to block 704, where the reference surface 502 is arranged relative to the camera 100. At block 706, the camera 100 captures characteristic arrays of data representing an image of the reference surface 502. At block 708, the characteristic arrays are manipulated to produce calibration information. Block 708 can take the form of block 710, in which the characteristic arrays are reduced in size, resulting in representative arrays. Or block 708 can take the form of block 712 in which the characteristic arrays are modeled via polynomials. Alternatively, block 708 can be carried out as a combination of blocks 710 and 712. Flow proceeds from block 708 to block 714, where the calibration information is stored. After block 714, flow ends at block 716.

Figure 8:
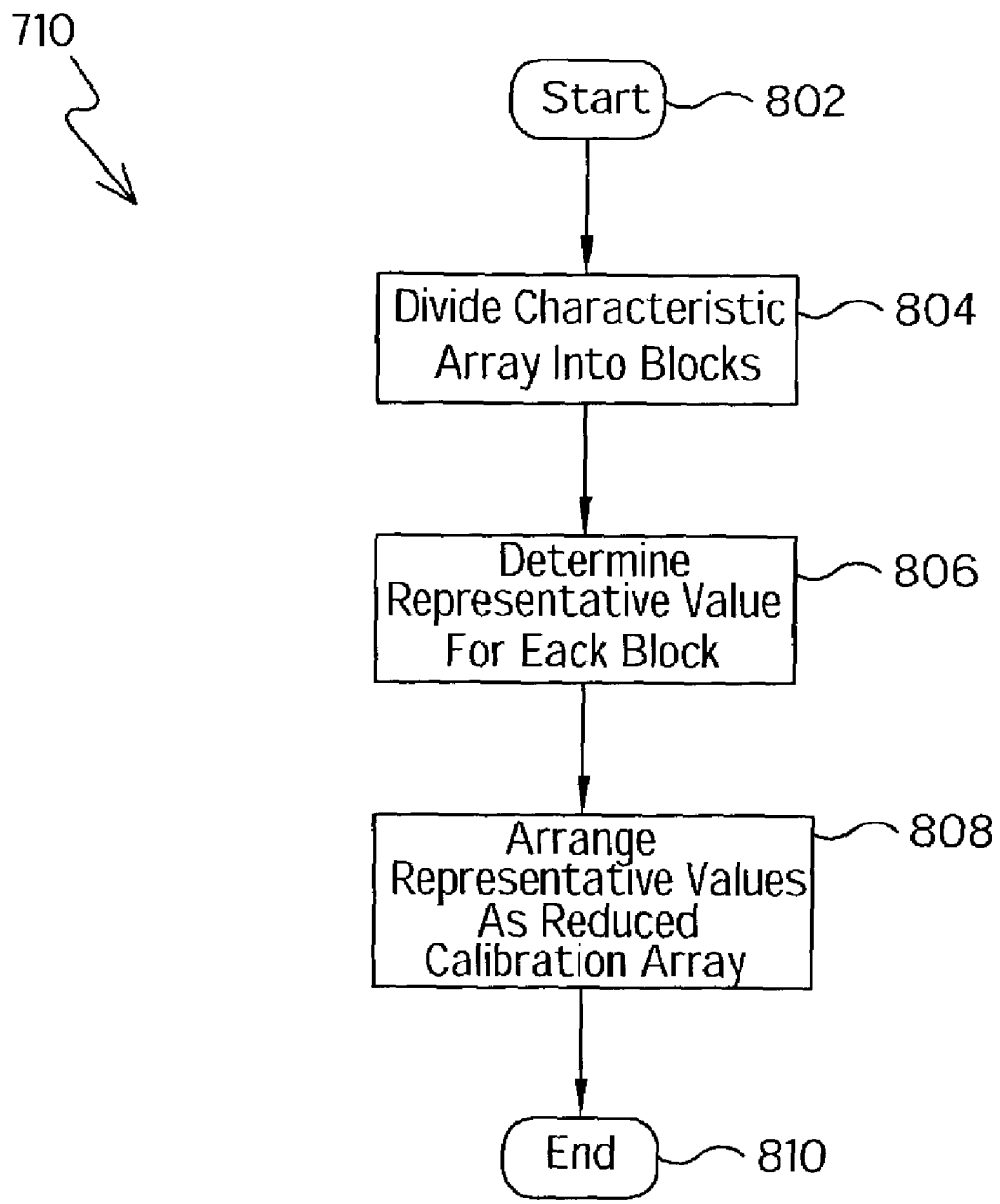
FIG. 8 depicts block 710 of FIG. 7 in more detail.

FIG. 8 is a flow chart depicting block 710 in more detail. Flow starts at block 802 and proceeds to block 804, where each characteristic array is divided into a plurality of blocks. Next step block, a representative value for each block is determined. At block 808, the representative values for a particular array are arranged as a reduced calibration array. Flow proceeds from block 808 to block 810 where the flow ends.

Once the set of reduced characteristic arrays, i.e., the calibration set, has been determined, it can be stored in the flash memory 120.

Use of the calibration sets to correct vignetting is described in commonly-assigned copending U.S. patent application Ser. No. 10/174,970, the entirety of which is hereby incorporated by reference.

It is noted that the process of reducing the characteristic data (resulting in a calibration set) can be performed in the camera, e.g., by the microcontroller 128 and/or the ASIC 106, or externally to the camera via the work station 124 partly or in whole.

When correcting image data using the calibration array, it can be desirable to calculate the corrected values as a function of the white point used in color correction of the white calibration source 502.

In those situations where it is desirable to correct the image as a function of the color correction used for the white calibration source, failure to take the color correction for the white calibration source into consideration can have adverse effects on illuminant detection and color correction in the image pipeline. The white point is different for every camera and can preferably be calculated by taking an average of the center pixels 204 in FIG. 2 of an image of the white calibration source 502.

Alternatively, rather than storing a set of calibration factors for every possible combination of camera parameters, an embodiment of the present invention fits a polynomial equation to each set of calibration factors and instead stores each set of polynomial coefficients, thereby effectively reducing the amount of data representing the reference image. Then for a given set of camera operating parameters, a set of polynomial equations can be selected that can be used to calculate a set of calibration factors, respectively. This polynomial technique is described in commonly-assigned copending U.S. patent application Ser. No. 10/174, 945, the entirety of which is hereby incorporated by reference.

The polynomial coefficient sets can be stored in the flash memory 120. Either the ASIC 106 and/or the microcontroller 128 can read the appropriate coefficient set from the flash memory 120, calculate the particular calibration factor, scale the corresponding pixel's raw magnitude using the calibration factor to obtain a corrected pixel magnitude; and then store the corrected value to the flash memory 120.

A polynomial equation can be fitted to each characteristic plane empirically using a least squares analysis, a regression analysis, etc. An example of a well known program that integrates numerical analysis, matrix computation, signal processing and graphics to thereby provide polynomial fitting capability is made available by THE MATHWORKS, INC. under the brand name of MATLAB. The characteristic data can be transferred to the workstation 124, which fits a polynomial to it. Then the coefficients of the polynomial can be stored in the camera's non-volatile memory, e.g., flash memory 120.

The invention includes the following advantages.

Using digital processing according to embodiments of the invention to remove color-dependent vignetting relaxes the performance requirements on the lenses, sensor and flash unit of the camera. This results in a lower cost camera.

As the individual components of a camera exhibit their own manufacturing tolerances, determining the calibration array according to embodiments of the invention after the camera has been assembled results in improved image quality because the individual tolerances of the respective components are taken into consideration. This yields better image quality than an alternative strategy of fixing the particular physical attributes of the lenses, sensor and flash unit so that they remove color-dependent vignetting because this strategy cannot adequately compensate for manufacturing tolerances at reasonable cost.

Calibrating the camera according to embodiments of the invention for color-dependent vignetting reduces, and can even eliminate, the variation in color-dependent vignetting exhibited with different aperture and zoom settings.

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. A method of producing calibration data for a digital camera, the method comprising:

arranging, in front of said camera, a reference surface that is to be imaged;

capturing, via said camera, a characteristic array of data corresponding to an image of said reference surface for each color that said camera can image; and doing to each characteristic array at least the following, dividing the characteristic array into a plurality of blocks, and determining a representative value for each block as a function of data within said block and without translation thereof to the frequency domain, and arranging the representative values as a reduced array.

2. The method of claim 1, wherein said manipulating is performed entirely by processing circuitry within said camera or entirely by a processor external to said camera.

3. The method of claim 1, wherein each block is the same size, and wherein said size is predetermined to substantially ensure less than about 1% variation in pixel magnitudes within each block.

4. The method of claim 3, wherein said size is one of 32×32 and 64×64.

5. The method of claim 1, further comprising:

storing each characteristic array as a calibration array corresponding to said reference image.

6. The method of claim 5, wherein, for each calibration array, said storing also stores an indication of values to which parameters of said camera parameters were set when the respective characteristic arrays were captured.

7. The method of claim 6, wherein said parameters are zoom setting and aperture setting.

8. The method of claim 7, wherein said zoom setting can include the values wide, medium and telephoto, and said aperture can include two values A and B, and wherein said combinations are: wide zoom and aperture A; medium zoom and aperture A; telephoto zoom and aperture A; wide zoom and aperture B; medium zoom and aperture B; and telephoto zoom and aperture B.

9. The method of claim 1, the method further comprising:
iteratively repeating the steps of arranging and capturing for a plurality of combinations of values to which parameters of said camera parameters are set when the respective characteristic arrays are captured.

10. The method of claim 9, wherein said parameters are zoom setting and aperture setting.

11. The method of claim 10, wherein said zoom setting can take the values wide, medium and telephoto, and said aperture can take two values A and B, and wherein said combinations are: wide zoom and aperture A; medium zoom and aperture A; telephoto zoom and aperture A; wide zoom and aperture B; medium zoom and aperture B; and telephoto zoom and aperture B.

12. The method of claim 1, wherein said camera can image a red array, a green array and a blue array.

13. A computer-readable medium having code portions embodied thereon that, when read by a processor, cause said processor to perform the method of claim 1.

14. A method of producing calibration data for a digital camera, the method comprising:
arranging, in front of said camera, a reference surface that is to be imaged;
capturing, via said camera, a characteristic array of data corresponding to an image of said reference surface for each color that said camera can image; and
doing to each characteristic array at least the following,
dividing the characteristic array into a plurality of blocks, and
determining a representative value for each block as a function of data within said block, and
arranging the representative values as a reduced array. wherein said determining includes at least the following,
choosing a sub-block of data within the block;
processing the pixel magnitudes within said block to achieve a result; and
setting said representative value equal to the result.

15. The method of claim 14, wherein a size of said sub-block is 8×8.

16. The method of claim 14, wherein said sub-block is centered on the block.

17. The method of claim 14, wherein said processing is averaging and said result is the average.

18. The method of claim 14, wherein said processing includes:
low pass filtering said pixel magnitudes within said block; and
selecting the median value in the filtered data as said result.

19. A system of producing calibration data for a digital camera, the system comprising:
a reference surface that is to be imaged;
an imager to capture a characteristic array of data corresponding to an image of said reference surface for each color that said camera can image; and
processing circuitry, present at least one of within said camera and external to said camera, to do to each characteristic array at least the following,
divide the characteristic array into a plurality of blocks,
determine a representative value for each block as a function of data within said block and without translation thereof to the frequency domain, and
arrange the representative values as a reduced array.

20. The system of claim 19, wherein said imager can image a red array, a green array and a blue array.

21. The system of claim 19, wherein each block is the same size, and wherein said size is predetermined to substantially ensure less than about 1% variation in pixel magnitudes within each block.

22. The system of claim 21, wherein said size is one of 32×32 and 64×64.

23. The system of claim 19, further comprising:
at least one memory the characteristic arrays as a calibration array corresponding to said reference image.

24. The system of claim 23, wherein, for each calibration array, indications of values to which parameters of said camera parameters were set when the respective characteristic arrays were captured are stored in said at least one memory.

25. The system of claim 24, wherein said parameters are zoom setting and aperture setting.

26. The system of claim 25, wherein said zoom setting can include the values wide, medium and telephoto, and said aperture can include two values A and B, and wherein said combinations are: wide zoom and aperture A; medium zoom and aperture A; telephoto zoom and aperture A; wide zoom and aperture B; medium zoom and aperture B; and telephoto zoom and aperture B.

27. The system of claim 19, wherein said imager and said processing circuitry are operable to iteratively capture and manipulate characteristic arrays for a plurality of combinations of values to which parameters of said camera parameters are set upon capture.

28. The system of claim 27, wherein said parameters are zoom setting and aperture setting.

29. The system of claim 28, wherein said zoom setting can take the values wide, medium and telephoto, and said aperture can take two values A and B, and wherein said combinations are: wide zoom and aperture A; medium zoom and aperture A; telephoto zoom and aperture A; wide zoom and aperture B; medium zoom and aperture B; and telephoto zoom and aperture B.

30. A system of producing calibration data for a digital camera, the system comprising:
a reference surface that is to be imaged;
an imager to capture a characteristic array of data corresponding to an image of said reference surface for each color that said camera can image; and
processing circuitry, present at least one of within said camera and external to said camera, to do to each characteristic array at least the following,
divide the characteristic array into a plurality of blocks.
determine a representative value for each block as a function of data within said block, and
arrange the representative values as a reduced array;
wherein, when determining, said processing circuitry is operable to4 do at least the following,
choose a sub-block of data within the block,
process the pixel magnitudes within said block to achieve a result, and
set said representative value equal to the result.

31. The system of claim 30, wherein a size of said sub-block is 8×8.

32. The system of claim 30, wherein said sub-block is centered on the block.

33. The system of claim 30, wherein, when processing, said processing circuitry is operable to average such that said result is the average.

34. The system of claim 30, wherein, when processing, said processing circuitry is operable to:

low-pass filter said pixel magnitudes within said block; and select the median value in the filtered data as said result.

35. A method of producing calibration data for a digital camera, the method comprising:
arranging, in front of said camera, a reference surface that is to be imaged;
capturing, via said camera, a characteristic array of data corresponding to an image of said reference surface for each color that said camera can image;
modeling the characteristic arrays with polynomial equations, respectively, the coefficients of the respective polynomial equations together representing a reduction in the total amount of data representing said reference image; and
storing the coefficients of the respective polynomial equations, the stored coefficients of the respective polynomial equations representing respective calibration polynomials.

36. The method of claim 35, wherein said polynomial is at least a second order polynomial.

37. The method of claim 35, wherein said modeling includes processing the respective characteristic array via the MATLAB brand of mathematical analysis software.

38. The method of claim 35, further comprising:
storing the polynomial coefficients as a calibration polynomial corresponding to said reference image.

39. The method of claim 35, wherein, for each calibration polynomial, said storing also stores an indication of values to which parameters of said camera parameters were set when the respective characteristic arrays were captured.

40. The method of claim 39, wherein said parameters are zoom setting and aperture setting.

41. The method of claim 40, wherein said zoom setting can include the values wide, medium and telephoto, and said aperture can include two values A and B, and wherein said combinations are: wide zoom and aperture A; medium zoom and aperture A; telephoto zoom and aperture A; wide zoom and aperture B; medium zoom and aperture B; and telephoto zoom and aperture B.

42. The method of claim 35, wherein the modeling step is performed without translation of the characteristic arrays to the frequency domain.

43. A computer-readable medium having code portions embodied thereon that, when read by a processor, cause said processor to perform the method of claim 35.

44. A system of producing calibration data for a digital camera, the system comprising:
a reference surface that is to be imaged;
an imager to capture a characteristic array of data corresponding to an image of said reference surface for each color that said camera can image; and
processing circuitry, present at least one of within said camera and external to said camera, to do at least the following,
model said characteristic array with a polynomial equation, the coefficients of said polynomial equation representing a reduction in said total amount of data representing said reference image, and
store the coefficients of the respective polynomial equations in a memory, the stored coefficients of the respective polynomial equations representing respective calibration polynomials.

45. The system of claim 44, wherein said polynomial is at least a second order polynomial.

46. The system of claim 44, wherein said processing circuitry is operable to model via execution of the MATLAB brand of mathematical analysis software.

47. The system of claim 44, wherein, for each calibration polynomial, said processing circuitry also is operable to store in the memory an indication of values to which parameters of said camera parameters were set when the respective characteristic arrays were captured.

48. The system of claim 47, wherein said parameters are zoom setting and aperture setting.

49. The system of claim 48, wherein said zoom setting can include the values wide, medium and telephoto, and said aperture can include two values A and B, and wherein said combinations are: wide zoom and aperture A; medium zoom and aperture A; telephoto zoom and aperture A; wide zoom and aperture B; medium zoom and aperture B; and telephoto zoom and aperture B.

50. The system of claim 44, wherein said processing circuitry is operable to model said characteristic array without translation thereof to the frequency domain.

* * * * *

UNITED STATES PATENT AND TRADEMARK OFFICE
CERTIFICATE OF CORRECTION

PATENT NO. : 7,151,560 B2
APPLICATION NO. : 10/174946
DATED : December 19, 2006
INVENTOR(S) : Kevin J. Matherson et al.

It is certified that error appears in the above-identified patent and that said Letters Patent is hereby corrected as shown below:

In column 5, line 33, delete "($G_{ref}$ / $G_{ref}$)" and insert -- ($G^{ref}$ / $G^{ref}$) --, therefor.

In column 9, line 26, in Claim 14, delete "imaged:" and insert -- imaged; --, therefor.

In column 9, line 35, in Claim 14, delete "array." and insert -- array, --, therefor.

In column 9, line 38, in Claim 14, delete "block;" and insert -- block, --, therefor.

In column 9, line 40, in Claim 14, delete "result;" and insert -- result, --, therefor.

In column 10, line 49, in Claim 30, delete "blocks." and insert -- blocks, --, therefor.

In column 10, line 54, in Claim 30, delete "to4" and insert -- to --, therefor.

Signed and Sealed this

Fifth Day of May, 2009

JOHN DOLL
*Acting Director of the United States Patent and Trademark Office*